US008811727B2

(12) United States Patent
Mohamed

(10) Patent No.: US 8,811,727 B2
(45) Date of Patent: Aug. 19, 2014

(54) METHODS FOR EFFICIENT CLASSIFIER TRAINING FOR ACCURATE OBJECT RECOGNITION IN IMAGES AND VIDEO

(76) Inventor: Moataz A. Rashad Mohamed, San Jose, CA (US)

( * ) Notice: Subject to any disclaimer, the term of this patent is extended or adjusted under 35 U.S.C. 154(b) by 202 days.

(21) Appl. No.: 13/525,221

(22) Filed: Jun. 15, 2012

(65) Prior Publication Data

US 2013/0336579 A1    Dec. 19, 2013

(51) Int. Cl.
*G06K 9/62* (2006.01)

(52) U.S. Cl.
USPC .......................................... 382/159; 382/225

(58) Field of Classification Search
None
See application file for complete search history.

(56) References Cited

U.S. PATENT DOCUMENTS

| 6,421,463 | B1* | 7/2002 | Poggio et al. | 382/224 |
| 7,194,114 | B2* | 3/2007 | Schneiderman | 382/118 |
| 8,447,139 | B2* | 5/2013 | Guan et al. | 382/291 |
| 8,498,950 | B2* | 7/2013 | Yankov et al. | 706/12 |
| 2008/0071711 | A1* | 3/2008 | Zhang et al. | 706/20 |
| 2011/0182497 | A1* | 7/2011 | Uliyar et al. | 382/154 |
| 2012/0002869 | A1* | 1/2012 | Han et al. | 382/159 |

* cited by examiner

*Primary Examiner* — Daniel Mariam
(74) *Attorney, Agent, or Firm* — Pillsbury Winthrop Shaw Pittman LLP

(57) ABSTRACT

An object recognition system and method is provided which uses automated algorithmically determined negative training. Negative training with respect to a particular object classifier allows for more streamlined and efficient targeted negative training, enabling time and cost savings while simultaneously improving the accuracy of recognition based on the targeted negative training.

17 Claims, 4 Drawing Sheets

Data flow diagram for positive and negative Training of an object recognition engine

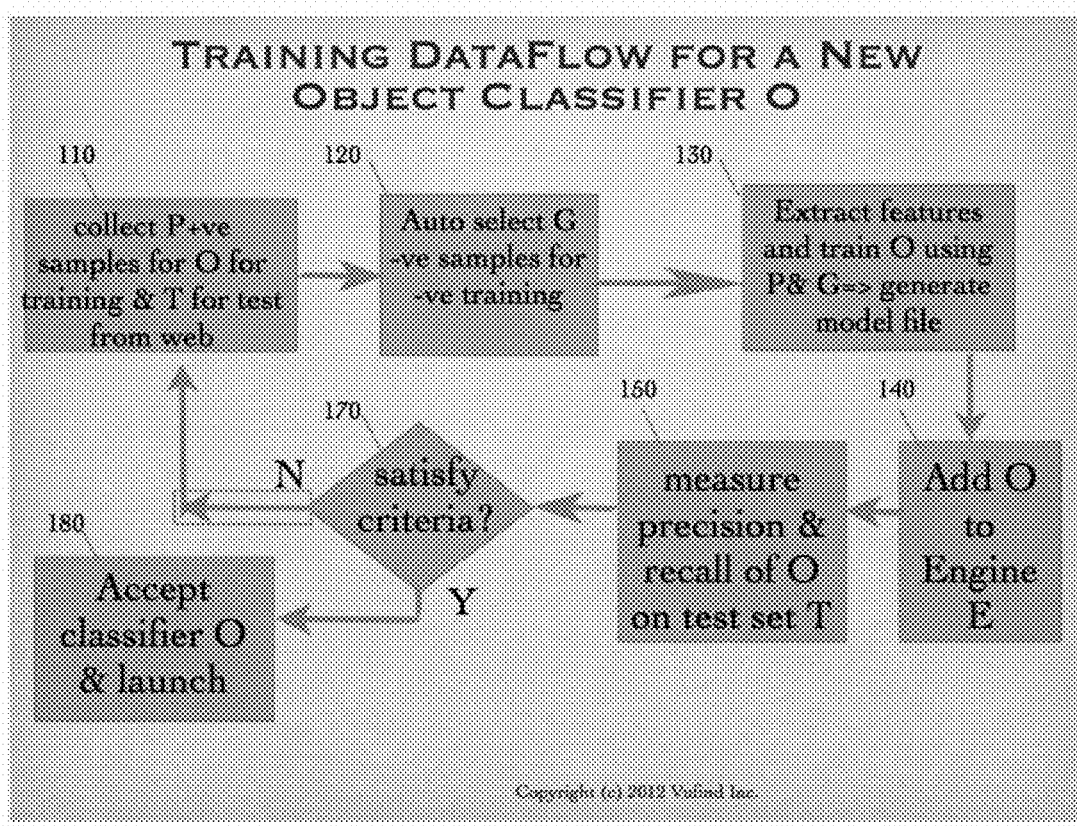
Fig1. Data flow diagram for positive and negative Training of an object recognition engine

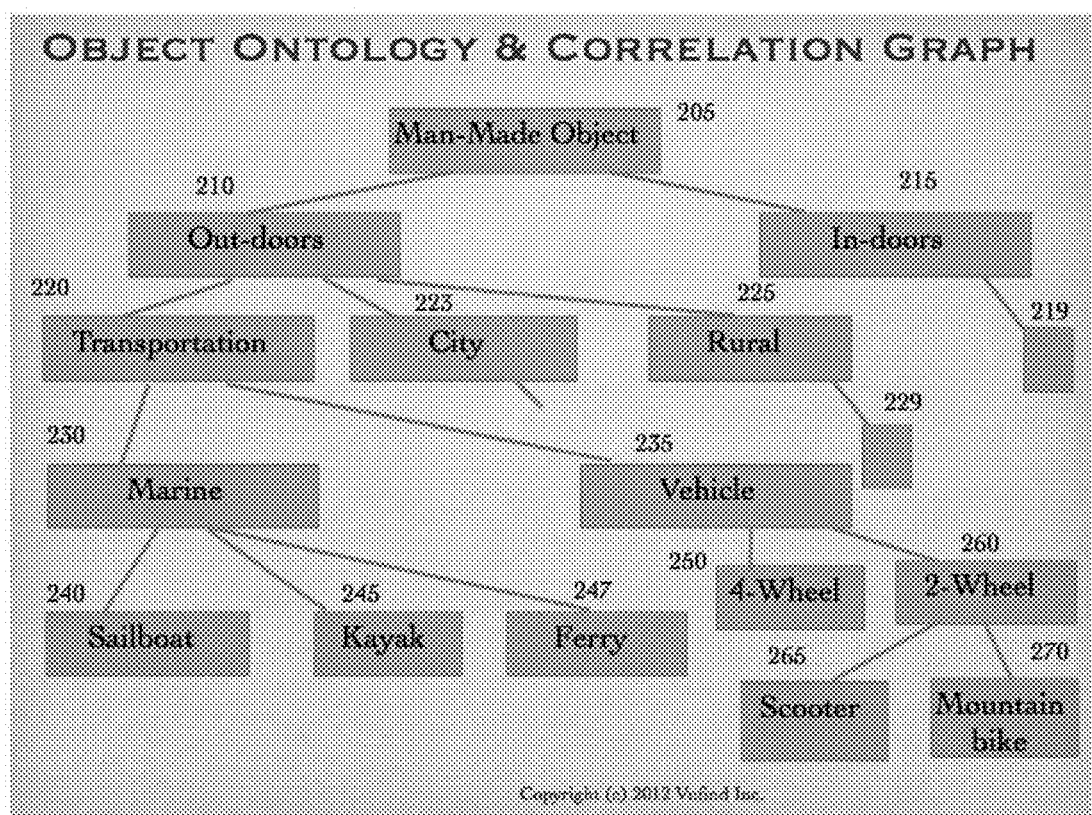
Fig 2. Object Ontology and Inter-object Correlation Graph

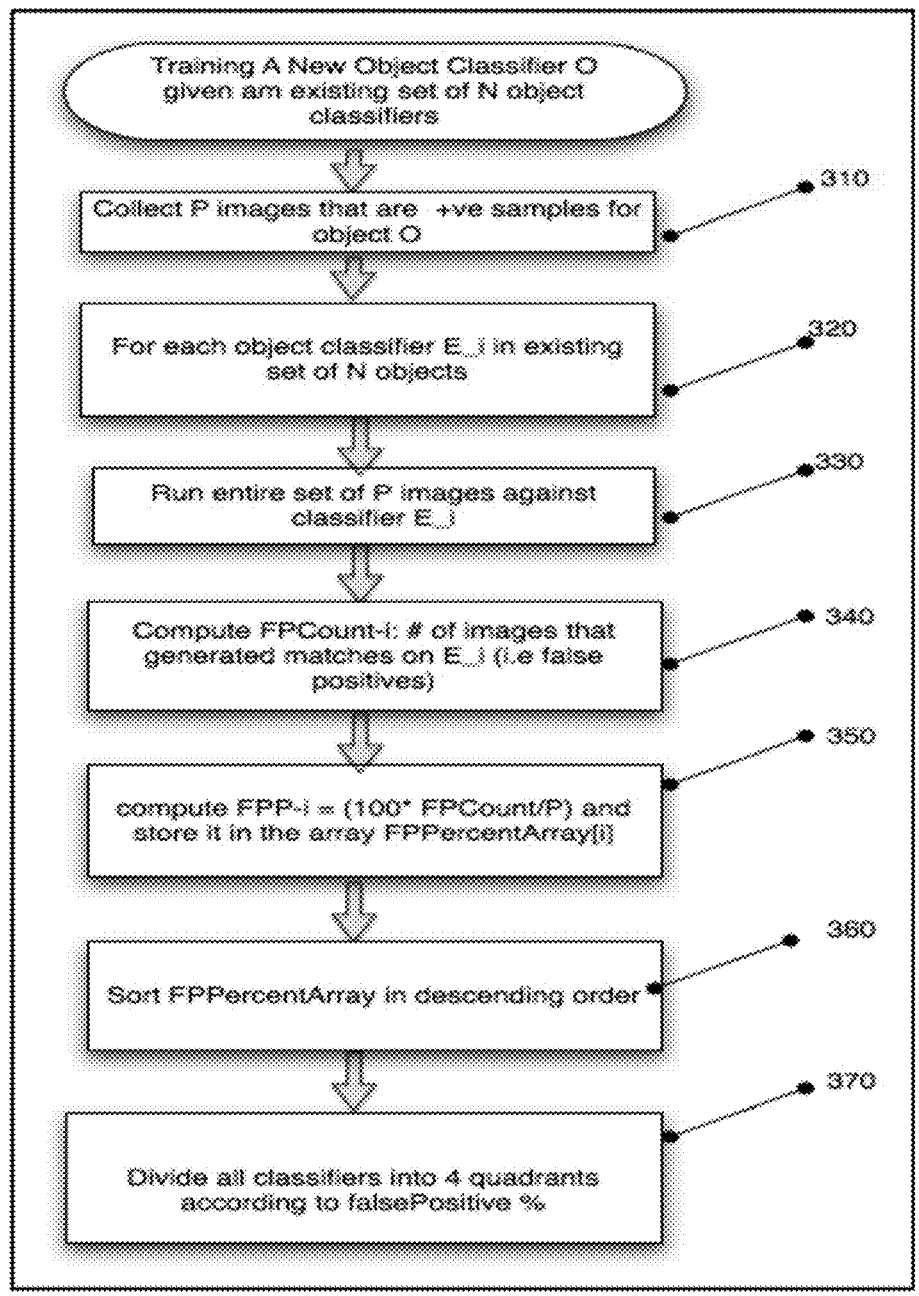
Figure 3. A method for inter-object classifier training

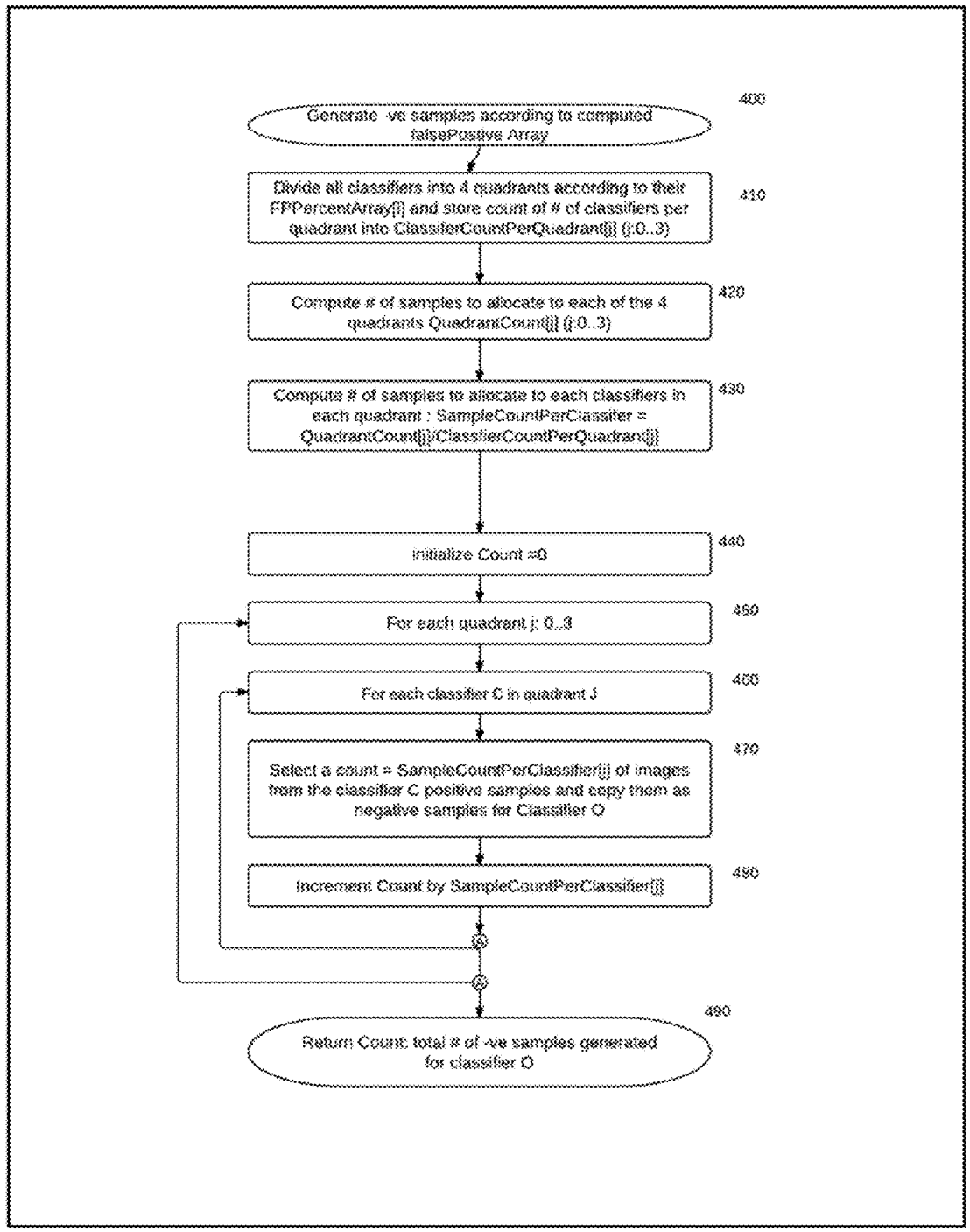
Fig 4: Generating the G negative training samples given the false positive percentages

METHODS FOR EFFICIENT CLASSIFIER TRAINING FOR ACCURATE OBJECT RECOGNITION IN IMAGES AND VIDEO

FIELD OF THE INVENTION

Embodiments of the present invention relate generally to systems and methods in the field of object recognition, and specifically negative sample selection and negative training of object recognition methods.

BACKGROUND OF THE INVENTION

Object recognition is a subset of the technological discipline of computer vision, whereby a computer is able to extract from an image, information that is necessary to solve a task. In the case of object recognition, the task is identification and classification of pre-specified, or learned, target objects within the image. A classical problem in computer vision is that of determining whether or not the image data contains some specific target object, feature, or activity. This task can conventionally be solved robustly and without effort by a human, despite the fact that the image of the target object(s) may vary somewhat in different viewpoint, size/scale, object translation or rotation, or even where the target object is partially obstructed or obscured in a given image. However, the problem is not fully and satisfactorily solved in computer vision for the non-specific, general case—arbitrary target objects in arbitrary situations. Conventional methods for dealing with this problem can, at best, solve it only for specific target objects; such as simple geometric objects (e.g., polyhedra), human faces, or printed or hand-written characters; and in specific situations, typically described in terms of well-defined illumination, background, and pose, or position and orientation of the target object relative to the camera.

Conventional appearance based methods of object recognition typically use both positive and negative training. Positive training uses example images, or "exemplars," of the target object in which the target object looks different and/or is presented under varying conditions; for example changes in lighting, changes in the color of the target object, changes in viewing angle/orientation, or changes in the size and/or shape of the target object; to train the machine to recognize the target object. This training is necessarily "domain specific," it requires training using exemplars in the same category as the target object (e.g. a machine is trained to recognize a car with exemplars of cars).

Negative training uses example images of objects that are not the target object to train the machine to recognize what the target object does not "look like." Conventional object recognition negative training methods are not domain specific, they do not train using negative exemplars from the same or similar object class (e.g., a machine is not trained to recognize a car by showing it images of only other man made transportation machines such as trains, airplanes, and bicycles). Instead, conventional object recognition negative training proceeds by presenting the computer with an immense breadth of images to teach it what the desired object does not look like (e.g., a machine may be negatively trained to recognize a car by showing it images of negative examples of such varied objects as flowers, staples, fish, forests, bicycles and hats). Training with only one or a few negative samples has been thought unlikely to train a machine to reliably distinguish all iterations of the desired object, driving conventional practitioners to train using large negative sample sets, many members of which are likely irrelevant, significantly driving up the time and cost required for reliable object recognition negative training.

The difficulty in achieving accuracy in object recognition is always related to the selection of positive (+ve) and negative (−ve) samples since these determine the visual patterns the classifier searches for to determine if the object in the image under test contains the object or not. The complexity and sensitivity arises in selecting a representative set of −ve samples that is at once sufficient and as small as possible, because the training process is very costly in terms of computational resources, internet bandwidth, and to a lesser degree storage. The current invention effectively solves all three constraints by minimizing the number of negative samples required to achieve the desired precision and recall rates.

SUMMARY

One embodiment of the present invention provides a method for training a computer vision object detection classifier using positive and negative samples comprising collecting positive samples for a classifier under training from imaging and social media sites, providing a set of a priori trained classifiers each with its own set of positive and negative samples used in their training, implementing an object recognition engine that can be run on all its trained classifiers, or on one classifier at time, creating an object taxonomy tree that specifies the degree of semantic correlation of an object to another object irrespective of visual attributes, and measuring false positive rates of said previously trained classifiers when said positive samples of the new classifier under training are input for recognition against each said priori trained classifier in the object recognition engine.

Another embodiment of the present invention provides a method for training a computer vision object detection classifier using positive and negative samples comprising, collecting positive samples for the classifier under training from imaging and social media sites, providing a set of a priori trained classifiers with its own set of positive and negative samples used in their training, implementing an object recognition engine to run on all its trained classifiers, and creating an object taxonomy tree that specifies the degree of semantic correlation of an object to another object irrespective of visual attributes, wherein the false positive rate of each previously trained classifier is measured when the positive samples of the new classifier under training are input for recognition against each priori trained classifier and such false positive rate is used to match this classifier against a range of false positive rates, and group classifiers that generated comparable false positive rates that fell into the same rate range into a set of batches that are selected.

Other objects, advantages, and applications of the embodiments of the present invention will be made clear by the following detailed description of a preferred embodiment of the present invention.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which:

FIG. 1 illustrates a flowchart of a method for object classification within an object recognition system in accordance with methods and systems consistent with an embodiment of the present invention.

FIG. 2 illustrates exemplary inter-object correlation network construction in accordance with methods and systems consistent with an embodiment of the present invention.

FIG. 3 illustrates a method for inter-object classifier training in accordance with methods and systems consistent with an embodiment of the present invention.

FIG. 4 illustrates a method for selection of the negative samples for negative training in accordance with methods and systems consistent with an embodiment of the present invention.

DETAILED DESCRIPTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

Thus, as described below, various embodiments of the invention may be readily combined, without departing from the scope or spirit of the invention. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In one embodiment of the present invention, a method of selecting the −ve samples from the images that were used as +ve samples for other object classifiers is shown. The number of samples selected from each object may be automatically determined according to the percentage of false positives.

FIG. 1 illustrates a flowchart depicting steps of a method for object classification within an object recognition system in accordance with an embodiment of the present invention. Exemplary step 110 collects positive (P) samples of images of the given current object under training (O) by downloading them from open imaging sources on the web such as, for example, the Stanford ImageNet image library, Flickr, any image database, or results of image searches on the Internet via a search engine, such as, for example Google, Bing or any other sources.

Exemplary step 120 describes a process to select negative samples (G) for negative training of object O which takes the said P positive images of O, the current recognition engine E with its existing set of priori-trained objects in the current version of the object recognition engine, and generates a set of G negative samples for object O to use for negative training 120. In exemplary step 120 P positive images and said G negative images for the new object O are input into a standard process of local feature extraction extracting typical computer vision features such as color histogram, edge histograms, etc. The feature vectors may be used for training according to a standard classifier training algorithm such as Support Vector Machine, or Viola Jones, etc to produce a model file 130. Said model file may be added to the object recognition engine, and the engine is therefore now able to detect objects O 140.

A random test set of T test images containing the new object O are then passed as inputs to the updated object recognition engine E for detection to measure its recognition performance using precision and recall measurements (as defined in the computer vision literature using the true positive, false positive, true negative and false negative counts) 150. The measured precision and recall on the T images is compared against the required threshold values passed as inputs 170. In the preferred embodiment, said required threshold values can be in the range 70-99% precision and 70-99% recall. If said measured precision and recall don't meet the threshold requirements, we repeat the entire process starting with collecting an additional set of positive sample images 110.

FIG. 2 depicts an object ontology and inter-object correlation graph that may be used in negative training methods. Several academic object ontology, also commonly referred to as taxonomy, are available. For efficiency and run time optimization purposes, a narrow taxonomy is used to optimize the look up and correlation calculations. An exemplary subset of object ontology is shown 200. The root of this subtree is the exemplary category Man-Made-Objects 205. Such category can be further subdivided into Out-doors man-made objects 210, and In-doors man-made objects 215. Within the Out-doors category 210, there may be further sub-categories for example, Transportation objects 220, City related objects 223, and Rural objects 225. Transportation 220 may be further divided into Marine transportation objects 230, and vehicles 235. Marine transportation objects 230 may be further divided into the final actual object names in this category such as but not limited to Sailboats 240, Kayaks 245, and Ferries 247. Vehicle category 235 may also be further divided into 4-wheel 250 and 2-wheel 260. The 2-wheel vehicles category 260 may be further divided into all the actual objects in that category such as Scooters 265, and Mountain Bikes 270 and similar 2-wheel objects that are of interest to include in the recognition engine. It will be understood that objects such as In-doors 215, and Rural 225 that have a dangling connections 219 and 229, are there to indicate that they may be further expanded to their subcategories and eventually the final list of objects, as described above in connection with Transportation 220. It is also understood that a new object O that gets added to the engine is inserted in this object ontology at its appropriate level in the hierarchy as a sibling of similar type objects. For example a new Touring bicycle would be added as a sibling to Mountain Bike with 2-wheel vehicle 260 as its parent category.

FIG. 3 depicts an embodiment of a method algorithm for negative training for object O 300. The input is the P positive images for object O collected from the web for positive training, T set of test images for object O, the existing object recognition engine F with its a-priori trained N classifiers which doesn't include object O 310. P images may be processed for object detection on the current set of N classifiers in the object recognition engine E_i, which does not include O, by iterating on all classifiers E_i for all i 320. The entire set of P images is processed against classifier E_i and match computations are reported 330, this count is recorded as the false positive count for this classifier FPCount_i 340. Care is taken in this step to make sure that such matches are indeed false positive matches, in other words, said image didn't have both objects simultaneously. The false positive percentage is computed as a percentage of FPcount_i to the total set P as FPP_i 350. This process is iterated for all N classifiers, and hence the array FPP_i has all the false positive percentages for all classifiers and said array is sorted in descending order 360. Logically this implies that the first element in this array is the classifier that caused the highest percentage of false positives, therefore the example illustrated earlier for training of Mountain Bikes, if classifier for scooter is the one generating a 65% false positive rate, that means of the set P images of mountain bikes, 65% of those P images were misconstrued as scooters. Therefore the method will proportionately select a large quantity of images of scooters to use in the negative training of mountain bikes to ensure the engine learns that scooters are not mountain bikes, and similarly, mountain bikes are used in the negative re-training of scooters.

In a non-limiting example, object O is a Mountain Bike, thus it's important that when the P mountain bikes images are collected 110, they are processed against all the existing objects in the recognition engine (for example, car, jet-plane, flower, scooter) to ensure those P images don't have these objects. Therefore any matches reported by the engine are surely all false-positives, i.e., the mountain bike is misconstrued as a scooter, or a car. The sorted array is divided into 4 quadrants 370. Where the top quadrant is the most offending objects that cause highest false positive, second quadrant is the second most offending, etc. The lowest quadrant may optionally be ignored completely because it contains the least offending, and hence including them in the negative training is a lower priority and depends on the count threshold constraint.

FIG. 4. depicts a continuation flowchart of the negative training process, 400, where the number of classifiers in each quadrant is counted and recorded in a new array of counts ClassifierCount-Per-Quadrant[i] 410. Quadrant-count[j] is computed as an allocation of total number of negative samples to allocate to the respective quadrant 420. This computation in the preferred embodiment is a function of the number of classifiers in the quadrant and their ratio to the total number of classifiers, and also the range of percentages in the quadrant. For example if the top offending quadrant has a high false-positive of 85% and the lowest in the quadrant is 70%, then this set of classifiers is problematic and causes extreme mismatches in the engine. Say also the number of classifiers in this set was 7 different classifiers out of 500 classifiers in the Engine. Then one can allocate a very high number of negative samples to this quadrant and the respective classifiers in this group, because a small concentration of highly offending (i.e., high false-positive rate) generate classifiers. Subsequently, the SampleCountPerClassifer the number of negative samples is computed to allocate to each classifier in each quadrant J by dividing Quadrant-count[j] by ClassifierCountPerQuadrant[j] 430. A running count is initialized 440. For each quadrant J of the 4 quadrant, 440, and each classifier C in the J quadrant 450 are looped, and a number of positive samples equal to SampleCountPerClassifer is selected and copied from the classifier C's positive training samples as negative samples for the classifier under training O.

In a non-limiting preferred embodiment, four quadrants are selected, i.e., dividing the false positive rate ranges into four batches, however many other variants are possible, and in fact some offer desired flexibility and fine grain control. For example, the rate ranges can be divided up into 8 batches hence the ranges are as follows 0-12.5%, 12.5%-25%, 25%-37.5% up to the last batch at the range 87.5%-10%. Similarly if one divides up the ranges into 10 batches, then it's every 10% i.e., 0-10%, 10%-20% up to 90%-100%, and so on. The finer granularity of the rate range, as for example the 10-batch scheme, allows one for example to completely ignore the batch at the lowest range, because a false positive rate between 0-10% is very low, and isn't considered of any material impact.

Intelligent Pruning Variants

A number of different variants of FIG. 4 are also possible in which intelligent pruning is performed in order to optimize the number of classifier from which to select samples for the negative training as described below. These embodiments are exemplar and other variations are contemplated within the scope of the present embodiments.

A. FIG. 4 with dropping a quadrant or batch:
In this embodiment, the lowest quadrant, i.e., the one with classifiers having false positive rates in the range 0-25% is dropped in the negative sample selection. In case of batches with 10% ranges, then classifiers in the false positive range 0-10% are dropped.

B. FIG. 4 with object ontology based pruning.
In this embodiment, in the object ontology network each object classifier's false positive rates is noted on it. The ontology tree is traversed using standard tree traversal methods, and the classifier with the lowest false positive rate in each subtree in the hierarchy is pruned, i.e., dropped and not used for negative sample selection process.

Although a specific embodiments of the present invention have been described, it will be understood by those of skill in the art they are not intended to be exhaustive or to limit the invention to the precise forms disclosed and obviously many modifications and variations are possible in view of the above teachings, including equivalents. Accordingly, it is to be understood that the invention is not to be limited by the specific illustrated embodiments, but only by the scope of the appended claims.

What is claimed is:
1. A method comprising:
collecting positive samples for a classifier under training from one or more web sites;
identifying a set of previously trained classifiers each having its own respective sets of positive and negative samples that were used in their training that are independent from the positive samples collected for the classifier under training;
implementing an object recognition engine with the identified set of previously trained classifiers, wherein in one mode of operation the object recognition engine can be run on all its trained classifiers at the same time, and in a second mode of operation the object recognition engine can be run on one classifier at a time;
running the object recognition engine in the second mode of operation on each of the previously trained classifiers with the positive samples collected for the classifier under training as input; and
measuring respective false positive rates of each of said previously trained classifiers based on the running of the object recognition on each of the previously trained classifiers.

2. The method of claim 1, further comprising:
training the classifier under training using negative samples from the respective sets of negative samples of one or more of the previously trained classifiers,
wherein a respective number of samples to use from each of the one or more previously trained classifiers is determined by weighting each of the one or more previously trained classifiers according to the measured false positive rates.

3. The method of claim 1, further comprising:
performing negative training of the classifier under training using positive samples from the respective sets of positive samples of one or more of the previously trained classifiers,
wherein the positive samples are selected from the respective sets of positive samples of the one or more previously trained object classifiers according to the relationship and co-occurrence frequency between objects associated with the classifier under training and the one or more previously trained classifiers in an object taxonomy tree.

4. The method of claim 1, further comprising:
performing training of the classifier under training using negative samples from the respective sets of negative samples of one or more of the previously trained classifiers,
wherein a total sum of negative samples selected from the one or more previously trained classifiers is optimally reduced so that it does not exceed a desired maximum which is a multiple of the number of positive samples already collected.

5. The method of claim 4, wherein the multiple is 200%.

6. The method in claim 1, further comprising:
performing negative training of the classifier under training using positive samples from the respective sets of samples of one or more of the previously trained classifiers,
wherein for the negative training of the classifier under training, negative samples are selected from related objects in an object taxonomy tree by collecting new positive samples from the one or more web sites that are independent of the samples used for positive training of the previously trained classifiers associated with the related objects.

7. The method of claim 1, further comprising:
performing negative training of the classifier under training using positive samples containing images of objects associated with one or more of the previously trained classifiers,
wherein a negative training set of the classifier under training is comprised of image samples of related objects collected from one or more web sites such that a count of the image samples per object corresponding to a previously trained classifier used for performing the negative training is determined according to the corresponding classifier's false positive ratio when tested against images of the classifier under training.

8. The method of claim 1, wherein the one or more web sites include social media sites.

9. A method comprising:
collecting positive samples for a classifier under training from one or more web sites;
identifying a set of previously trained classifiers each having its own respective sets of positive and negative samples that were used in their training that are independent from the positive samples collected for the classifier under training;
implementing an object recognition engine with the identified set of previously trained classifiers;
running the object recognition engine with the positive samples collected for the classifier under training as input;
measuring a false positive rate of each previously trained classifier based on the running of the object recognition on each of the previously trained classifiers; and
grouping together previously trained classifiers that generated comparable false positive rates.

10. The method of claim 9, wherein the previously trained classifiers are grouped together based on false positive rates that are divided into four quadrants according to the following ranges: 0-25%, 25%-50%, 50%-75%, and 75%-100%.

11. The method of claim 10 wherein classifiers in the same false positive quadrant group are assigned the same positive sample allocation irrespective of a correlation between objects associated with the classifiers according to an object taxonomy tree to and an object associated with the classifier under training.

12. The method of claim 10, wherein classifiers in the same false positive quadrant group are ranked according to a respective correlation of objects associated with the classifiers to an object associated with the classifier under training in an object taxonomy tree such that higher correlation classifiers are at a higher rank within the quadrant.

13. The method of claim 9, wherein the grouping together of previously trained classifiers is performed based on false positive rates that are divided into n segments, such that a first segment has classifiers within the range 0 up to 100/n %, a second range is 100/n % up to 100*2/n %, and a last range is 100*(n−1)/n %–100% where n can be any integer between 2 and 100.

14. The method of claim 9, wherein classifiers having a lowest false positive rate are ignored in subsequent negative training of the classifier under training.

15. The method of claim 9, wherein the object recognition engines runs on one classifier at time.

16. The method of claim 9, further comprising:
selecting negative samples for negative training of the classifier under training wherein the negative samples are selected from positive samples used for training the one or more previously trained classifiers; and
iteratively performing the selecting of negative samples and negative training until measured precision and recall rates for detection for the classifier under training satisfy certain desired threshold values.

17. The method of claim 9, further comprising:
training the classifier under training using positive and negative samples wherein the positive and negative samples are selected from the respective sets of one or more of the previously trained classifiers using an object ontology network and the measured false positive rates such that that within each subtree in the ontology network, classifiers associated with objects in the subtree with the lowest false positive rate are eliminated and not used in the training.

* * * * *